US009355478B2

(12) United States Patent
Simon et al.

(10) Patent No.: US 9,355,478 B2
(45) Date of Patent: May 31, 2016

(54) REFLECTING CHANGES TO GRAPH-STRUCTURED DATA

(75) Inventors: Jan Simon, Prague (CZ); Jan Trcka, Revnice (CZ); Pavel Chmelicek, Prague (CZ)

(73) Assignee: Hewlett Packard Enterprise Development LP, Houston, TX (US)

( * ) Notice: Subject to any disclaimer, the term of this patent is extended or adjusted under 35 U.S.C. 154(b) by 730 days.

(21) Appl. No.: 13/183,715

(22) Filed: Jul. 15, 2011

(65) Prior Publication Data

US 2013/0016116 A1    Jan. 17, 2013

(51) Int. Cl.
*G06T 11/20*    (2006.01)

(52) U.S. Cl.
CPC .................................. *G06T 11/206* (2013.01)

(58) Field of Classification Search
CPC ......... G06T 11/20; G06T 11/206; G09G 5/02
See application file for complete search history.

(56) References Cited

U.S. PATENT DOCUMENTS

| | | | | |
|---|---|---|---|---|
| 5,515,487 | A * | 5/1996 | Beaudet et al. | 345/440 |
| 6,108,698 | A * | 8/2000 | Tenev et al. | 709/220 |
| 6,154,215 | A * | 11/2000 | Hopcroft et al. | 345/418 |
| 6,654,761 | B2 * | 11/2003 | Tenev et al. | |
| 7,233,333 | B2 * | 6/2007 | Lomask | 345/440 |
| 7,242,413 | B2 * | 7/2007 | Chu et al. | 345/619 |
| 7,539,697 | B1 * | 5/2009 | Akella | G06F 17/30958 |
| 2001/0045952 | A1 * | 11/2001 | Tenev et al. | 345/440 |
| 2002/0154175 | A1 * | 10/2002 | Abello et al. | 345/853 |
| 2004/0205726 | A1 * | 10/2004 | Chedgey et al. | 717/125 |
| 2005/0262470 | A1 * | 11/2005 | Gavrilov | 717/100 |
| 2006/0143205 | A1 * | 6/2006 | Fuchs | G06F 17/30091 |
| 2006/0165169 | A1 * | 7/2006 | Ng et al. | 375/240.12 |
| 2006/0181531 | A1 * | 8/2006 | Goldschmidt | H04L 41/0253 345/440 |
| 2007/0078849 | A1 * | 4/2007 | Slothouber | G06Q 30/02 |
| 2008/0016474 | A1 * | 1/2008 | Guido et al. | 715/854 |
| 2008/0155305 | A1 | 6/2008 | Hind et al. | |
| 2008/0246769 | A1 | 10/2008 | Milov et al. | |
| 2009/0157724 | A1 * | 6/2009 | De Peuter et al. | 707/102 |
| 2010/0073377 | A1 * | 3/2010 | Cai et al. | 345/440 |
| 2010/0079460 | A1 * | 4/2010 | Breeds et al. | 345/440 |
| 2010/0169137 | A1 * | 7/2010 | Jastrebski et al. | 705/7 |
| 2010/0277481 | A1 * | 11/2010 | Cao et al. | 345/440 |
| 2010/0318583 | A1 | 12/2010 | Cohen | |

* cited by examiner

*Primary Examiner* — Barry Drennan
*Assistant Examiner* — Terrell Robinson
(74) *Attorney, Agent, or Firm* — Hewlett Packard Enterprise Patent Department (57) ABSTRACT

Methods, computer-readable media, and systems for reflecting changes to graph-structured data are provided. One method for reflecting changes to graph-structured data includes receiving a plot of a number of viewed nodes that are viewed on a first graph, constructing a second graph in response to a change in the graph-structured data associated with the first graph, by determining a number of viewed edges between a first viewed node of the number of viewed nodes and a remainder of the number of viewed nodes, determining a number of node connects for the first viewed node, and providing an indication of completeness of the first viewed node based on whether the number of node connects is greater than the number of viewed edges between the first viewed node and the number of viewed nodes, and merging the first graph and the second graph to create a merged graph.

20 Claims, 4 Drawing Sheets

REFLECTING CHANGES TO GRAPH-STRUCTURED DATA

BACKGROUND

Graphs can be useful in displaying pictorial relationships between a number of data points. For example, a graph can provide a means for viewing relationships in a network (e.g., users of a social networking site such as Facebook®). Challenges can exist in displaying these relationships, however, due to the speed at which relationships can change within the network. As a result of the speed at which relationships can change, graphs may be updated accordingly to represent changes in the relationships. Further challenges can arise when trying to maintain a format (e.g., color, size, and position of graphed elements) when graphs are updated.

DETAILED DESCRIPTION

The present disclosure provides methods, computer-readable media, and systems for reflecting changes to graph-structured data. A plot of a number of viewed nodes that are viewed on a first graph can be received. A second graph can be constructed in response to a change in the graph-structured data associated with the first graph. The second graph can be constructed by determining a number of viewed edges between a first viewed node of the number of viewed nodes and a remainder of the number of viewed nodes. The second graph can be constructed by determining a number of node connects for the first viewed node. The second graph can be constructed by providing an indication of completeness of the first viewed node based on whether the number of node connects is greater than the number of viewed edges between the first viewed node and the number of viewed nodes. The first graph and the second graph can be merged to create a merged graph.

A novel technique for reflecting changes to graph-structured data can provide processing capabilities for reflecting changes to graph-structured data that allow for refreshing of the graph-structured data while maintaining a format of the graph-structured data. Completeness of the viewed nodes can be indicated as complete or incomplete, thus providing an indication of a relationship between the number of viewed nodes and a number of underlying nodes. The first graph can be merged with the second graph to create a merged graph that causes changes to the graph-structured data to be communicated while maintaining the format of the graph-structured data.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component of the drawing. Similar elements or components between different figures may be identified by the use of similar digits. For example, 116-1A may reference element "116-1A" in FIG. 1A, and a similar element may be referenced as 116-1B in FIG. 1B.

Figure 1A:
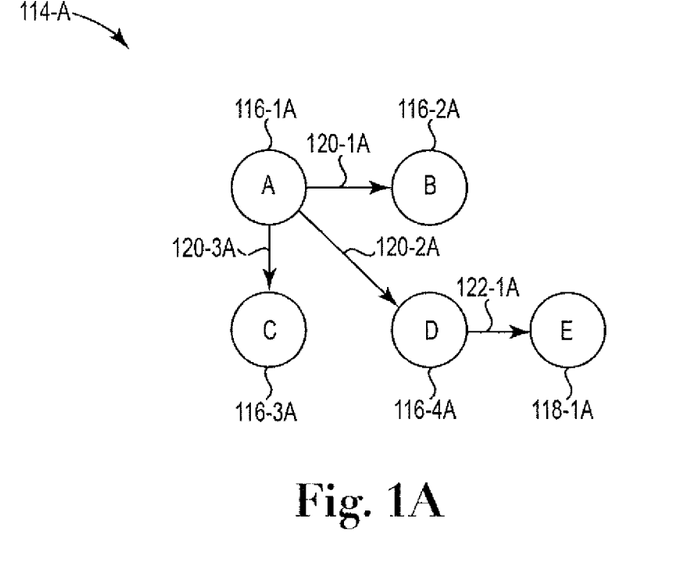
FIGS. 1A-1D illustrate diagrams of examples of graph-structured data according to the present disclosure.

FIGS. 1A-1D illustrate diagrams of examples of graph-structured data according to the present disclosure. FIG. 1A illustrates a diagram of an example of graph-structured data 114-A that includes a number of underlying nodes 118-1A, a number of viewed nodes 116-1A, 116-2A, 116-3A, and 116-4A, a number of underlying edges 122-1A, and a number of viewed edges 120-1A, 120-2A, and 120-3A. Underlying edge 122-1A and viewed edges 120-1A, 120-2A, and 120-3A are shown as directed edges (e.g., represented by a line with an arrow) in FIG. 1A.

As used herein, graph-structured data 114-A can include data represented as entities and relationships between the entities. In an example, an entity can be representative of a computer in a computer network that has a relationship with a number of other computers of the computer network. For example, the computer can have a relationship with the number of other computers by connecting with and/or sharing information with the number of other computers. In an example, an entity can be representative of a user on a social networking site that has a relationship with a number of other users of the social networking site, although examples are not so limited. For example, where the social networking site is Facebook®, the user may have a relationship with the number of other users on Facebook® by being friends with the number of other users.

Graph-structured data 114-A can, in some examples, be visualized as a graph having a number of nodes 118-1A, 116-1A, 116-2A, 116-3A, and 116-4A and a number of edges 122-1A, 120-1A, 120-2A, and 120-3A. In an example, graph-structured data 114-A can be visualized as a directed acyclic graph, although examples are not so limited. A directed acyclic graph can be a representation of data items (e.g., entities), each of which can be represented by a node of the graph (e.g., 118-1A, 116-1A, 116-2A, 116-3A). The nodes of a directed acyclic graph can be connected by edges (e.g., 122-1A, 120-1A, 120-2A, and 120-3A), which can be unidirectional (e.g., directed) in nature and can represent a relationship between the nodes. For example, a relationship between nodes 116-1A and 116-2A can be represented by edge 120-1A.

As discussed herein, entities can be represented by nodes 118-1A, 116-1A, 116-2A, 116-3A, and 116-4A, which, in an example, can be a number of viewed nodes 116-1A, 116-2A, 116-3A, and 116-4A and a number of underlying nodes 118-1A. Viewed nodes 116-1A, 116-2A, 116-3A, and 116-4A can be visualized on a graph by default and underlying nodes 118-1A can be nodes that have a number of relationships with the viewed nodes 116-1A, 116-2A, 116-3A, and 116-4A, but are not displayed by default. For example, when a user views the graph, underlying nodes 118-1A are not displayed unless a selection is made by the user to display the underlying nodes 118-1A.

As discussed herein, edges 122-1A, 120-1A, 120-2A, and 120-3A can represent relationships between the nodes 118-1A, 116-1A, 116-2A, 116-3A, and 116-4A (e.g., entities) and can be a number of viewed edges 120-1A, 120-2A, and 120-3A and a number of underlying edges 122-1A. Viewed edges 120-1A, 120-2A, and 120-3A can represent a number of relationships between viewed nodes 116-1A, 116-2A, 116-3A, and 116-4A and can be visualized on a graph by default. Underlying edges 122-1A can be edges that represent a number of relationships between viewed nodes 116-4A and underlying nodes 118-1A, but are not displayed by default. For example, when the user views the graph, the number of underlying edges 122-1A are not displayed unless a selection is made by the user to cause the underlying nodes 118-1A and/or underlying edges 122-1A to be communicated to a display, for example.

In an example, underlying edges 122-1A and/or viewed edges 120-1A, 120-2A, and 120-3A can be directed edges (e.g., represented by a line with an arrow), as shown in FIG. 1A. Alternatively, and/or in addition, the number of viewed edges 120-1A, 120-2A, and 120-3A and/or the number of underlying edges 122-1A can be undirected edges. A directed edge can display a relationship between two nodes, where the relationship is asymmetric (e.g., only one node is aware of the identify of the other node). For example, when a program on a first computer transfers data (e.g., bytes) to a program on a second computer through a User Datagram Protocol (UDP), the data can be transferred in one direction from the first computer to the second computer without verifying a readiness or a state of the second computer.

An undirected edge can display a relationship between two nodes, where the relationship is symmetric (e.g., each node is aware of each other's identity). For example, when a program on a first computer transfers data (e.g., bytes) to a program on a second computer through Transmission Control Protocol (TCP), the computers must establish a connection through a handshake process before entering a data transmission phase. The handshake process allows the two computers to negotiate parameters (e.g., information transfer rate). In doing so, the first computer becomes aware of the second computer's identity and the second computer becomes aware of the first computer's identity, thus creating a symmetric, undirected relationship. This can be displayed by an undirected edge, which can be a line without an arrow.

Figure 1B:
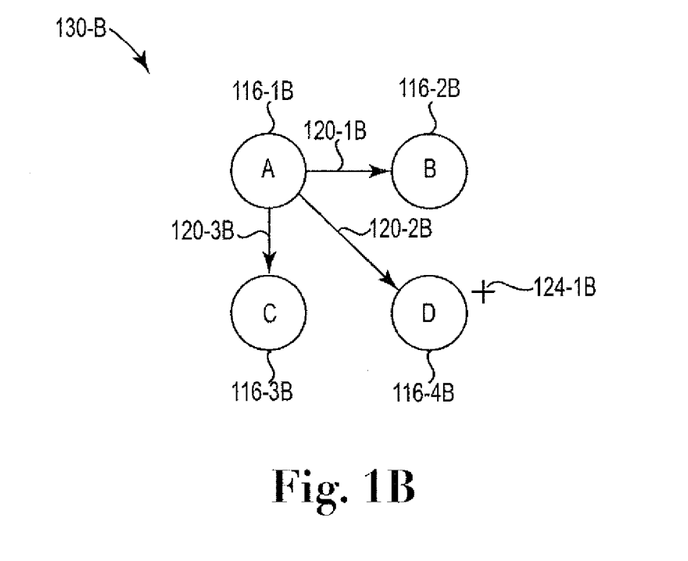

FIG. 1B is a diagram of a first graph 130-B, which can be representative of a portion of the graph-structured data 114-A illustrated in FIG. 1A. The first graph 130-B can include a number of viewed nodes 116-1B, 116-2B, 116-3B, and 116-4B and a number of viewed edges 120-1B, 120-2B, and 120-3B. In an example, the first graph 130-B can be visualized by a visualization client. The visualization client can be a single component and/or multiple components that displays a view of the graph-structured data, which can be acquired from a graph data tool. Alternatively, and/or in addition, the visualization client can be a single component and/or multiple components that can cause the graph-structured data to be communicated to a display. In an example, there can be more than one visualization client and each client can decide which nodes and/or edges to display and/or communicate to a display and in what format. The graph data tool can be a single and/or multiple components that can receive, store, and/or provide graph-structured data. The visualization client and/or graph data tool can be implemented as computer programs that contain executable instructions written in a scripting language such as JavaScript and/or ActionScript stored on a computer readable medium.

The first graph 130-B can include a user selectable indication 124-1B that viewed node 116-4B is incomplete. In an example, the user can select the indication 124-1B by clicking on the indication 124-1B. Upon selection of the indication 124-1B, a number of underlying nodes 118-1B that have a relationship with viewed node 116-4B can be displayed along with a number of underlying edges 122-1B. In an example, upon selection of the indication 124-1B a graph similar to that shown in FIG. 1A can be displayed to the user.

Figure 1C:
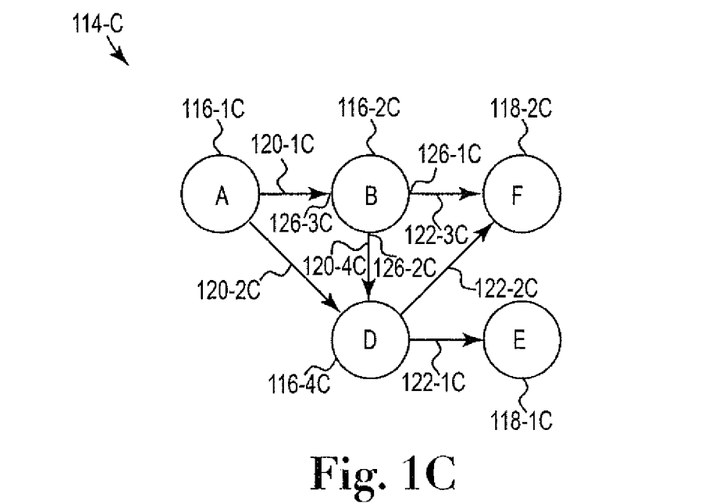

FIG. 1C illustrates a diagram of an example of changed graph-structured data 114-C that includes a number of underlying nodes 118-1C and 118-2C, a number of viewed nodes 116-1C, 116-2C, and 116-4C, a number of underlying edges 122-1C, 122-2C, and 122-3C, a number of viewed edges 120-1C, 120-2C, and 120-4C, and a number of node connects 126-3C, 126-2C, and 126-1C. The changed graph-structured data 114-C includes a number of changes to graph-structured data 114-A, which include the subtraction of viewed node 116-3A and its respective viewed edge 120-3A, shown in FIG. 1A; and addition of underlying node 118-2C and its respective edges 122-3C and 122-2C.

In an example, the number of changes to graph-structured data 114-A can be representative of Facebook® users B and D (e.g., represented by viewed nodes 116-2C and 116-4C, respectively) sending a friend request and becoming friends with Facebook® user F (e.g., represented by underlying node 118-2C). When users B and/or D become friends with user F, the change in relationship between the users can be represented by underlying edges 122-3C, 122-2C connecting users B and/or D with user F.

Alternatively, and/or in addition, the number of changes to graph-structured data 114-A can be representative of a user A (e.g., represented by viewed node 116-1C) de-friending user C (e.g., represented by viewed node 116-3A). When user A de-friends user B, the change in relationship between the users can be represented by subtracting viewed edge 120-3A and viewed node 116-3A. In an example, the number of changes to the graph structured data can be representative of any type of relationship, such as a change in a relationship between a number of computers in a computer network, although examples are not so limited.

Figure 1D:
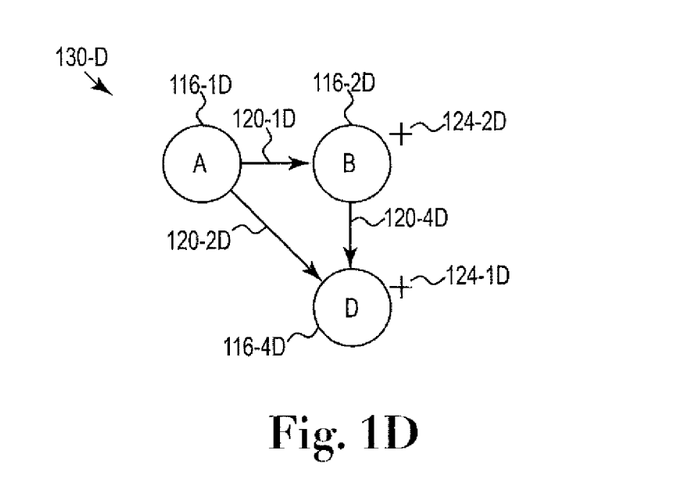

In response to the number of changes in the graph-structured data 114-A associated with the first graph 130-B, the graph data tool can construct a second graph 130-D to represent the number of changes in the graph-structured data 114-A associated with the first graph 130-B. Constructing the second graph 130-D can be accomplished by: determining a number of viewed edges between a first viewed node of the number of viewed nodes and a remainder of the number of viewed nodes; determining a number of node connects for the first viewed node; and providing an indication of completeness of the first viewed node based on whether the number of node connects is greater than the number of viewed edges between the first viewed node and the remainder of the number of viewed nodes. This can be repeated for each of the number of viewed nodes to determine whether each of the number of viewed nodes are complete.

In an example, constructing the second graph 130-D can include determining a number of viewed edges 120-1C and 120-4C between a viewed node 116-2C (e.g., first viewed node) and a remainder of the number of viewed nodes 116-1C and 116-4C. When determining the number of viewed edges 120-1C and 120-4C between the viewed node 116-2C and the remainder of the number of viewed nodes 116-1C and 116-4C, underlying edges existing between the viewed node 116-2C and the number of underlying nodes 118-2C can be excluded.

As shown in FIG. 1C, three nodes (e.g. 116-1C, 116-4C, and 118-2C have relationships with the viewed node 116-2C, wherein two of the three nodes are viewed nodes 116-1C and 116-4C (e.g., two viewed edges 120-1C and 120-4C connect the two viewed nodes 116-1C and 116-4C to the viewed node 116-2C) and one of the three nodes is an underlying node 118-2C (e.g., one underlying edge 122-3C connects the underlying node 118-2C to the viewed node 116-2C). Therefore, two viewed edges 120-1C and 120-4C exist between the viewed node 116-2C and the remainder of the number of viewed nodes 116-1C and 116-4C.

In an example, constructing the second graph 130-D can include determining the number of node connects 126-3C, 126-2C, and 126-1C for the viewed node 116-2C. A node connect 126-3C, 126-2C, and 126-1C can be defined as a number of points where an edge (e.g., viewed edge 120-1C, 120-4C and/or underlying edge 122-3C) connects to a node (e.g., viewed node 116-2C and/or underlying node). When determining the number of node connects 126-3C, 126-2C, and 126-1C for the viewed node 116-2C, the number of node connects 126-2C, and 126-1C existing where viewed edges 120-1C, 120-4C from viewed nodes 116-1C and 116-4C are connected to the viewed node 116-2C as well as the number of node connects 126-1C existing where underlying edges 122-3C from underlying nodes 118-2C are connected to the first viewed node 116-2C can be included in determining the number of node connects 126-3C, 126-2C, and 126-1C for the viewed node 116-2C.

For example, as shown in FIG. 1C, three node connects 126-3C, 126-2C, and 126-1C exist for the viewed node 116-2C, which is greater than the two viewed edges 120-1C and 120-4C that exist for the viewed node 116-2C. As a result, an indication that the viewed node 116-2C is incomplete can be provided because the number of node connects 126-3C, 126-2C, and 126-1C for the viewed node 116-2C is greater than the number of viewed edges 120-1C and 120-4C between the viewed node 116-2C and the number of viewed nodes 116-1C and 116-3C. An example of such an indication is provided in FIG. 1D by element 124-2D.

FIG. 1D illustrates a diagram of the second graph 130-D that includes a number of viewed nodes 116-1D, 116-2D, and 116-4D, a number of viewed edges 120-1D, 120-2D, and 120-4D, and a number of indications 124-2D and 124-1D that indicate viewed nodes 116-2D and 116-4D are incomplete. In an example, the first graph 130-B can be merged with the second graph 130-D with a visualization client. In an example, the visualization client can query the graph data tool for changes to the graph-structured data. The visualization client can then receive the changes to the graph-structured data from the graph data tool and proceed with merging the first graph 130-B and the second graph 130-D.

Merging the first graph 130-B and the second graph 130-D can include removing viewed nodes 116-3B and their respective edges 120-3B from the first graph 130-B that no longer exist; removing a number of viewed edges from the first graph 130-B that no longer exist; and adding a number of new viewed edges 120-4D between the number of viewed nodes 116-1B, 116-2B, and 116-4B to the first graph 130-B. Alternatively, and/or in addition, a number of indications 124-1D and 124-2D that viewed nodes 116-2D and 116-4D are incomplete can also be updated (e.g., indication 124-2D that viewed node 116-2D is incomplete can be added to viewed node 116-2D).

In an example, removing the viewed nodes and their respective viewed edges that no longer exist can be performed by causing the visualization client to query the graph data tool for changes to the graph-structured data. The visualization client can then receive the changes to the graph-structured data from the graph data tool and proceed with merging the first and second graph to reflect the changes. Alternatively, and/or in addition, the graph data tool can push graph metadata that includes the changes to the graph-structured data to the visualization client.

Figure 2:
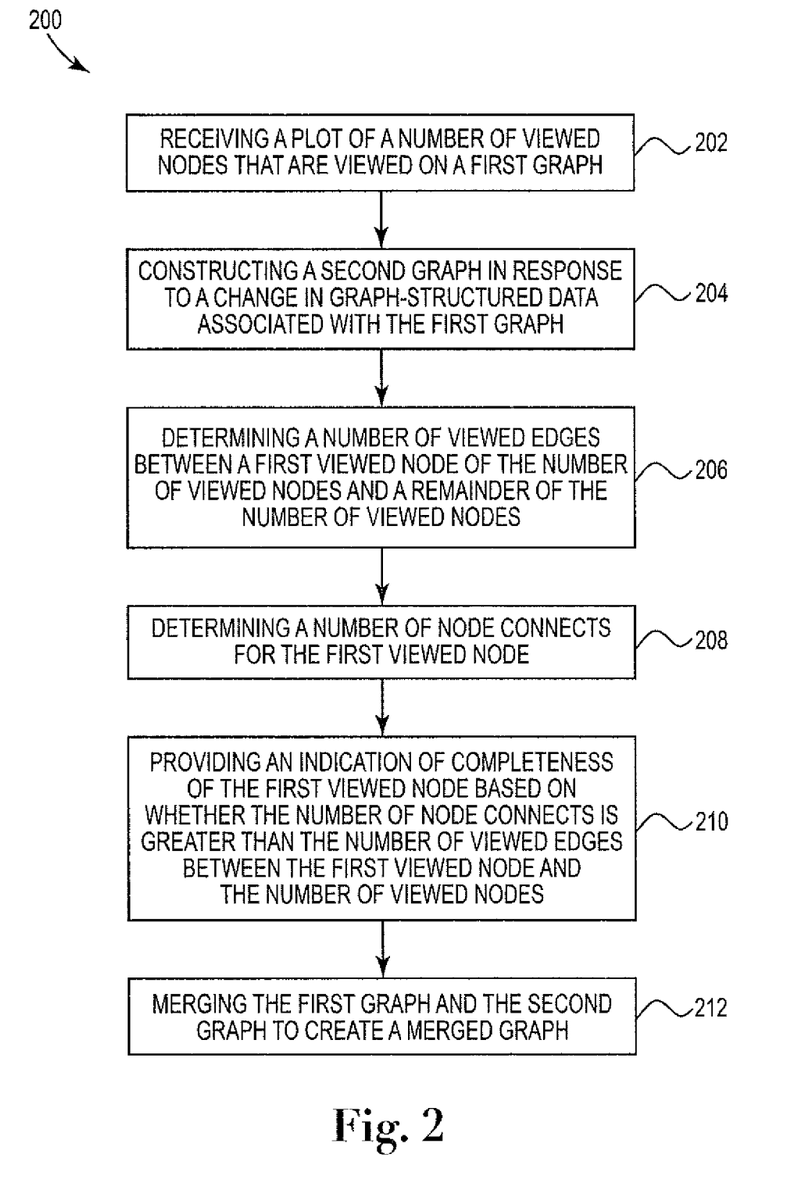
FIG. 2 is a block diagram illustrating an example of a method for reflecting changes to graph-structured data according to the present disclosure.

FIG. 2 is a block diagram illustrating an example of a method 200 for reflecting changes to graph-structured data according to the present disclosure. The method can include receiving 202 a plot of a number of viewed nodes that are viewed on a first graph. In an example, the plot of the number of viewed nodes can be received by the graph data tool. Alternatively, and/or in addition, a plot of the number of viewed edges can be received by the graph data tool.

The plot of the number of viewed nodes can include graph metadata. Graph metadata can be defined as data about a graph and in some examples can include the format of the graph and/or relationships between the number of viewed nodes and/or the number of underlying nodes. In an example, the plot of the number of viewed nodes on the first graph can be sent by a visualization client and received by a graph data tool.

The method can include constructing 204 a second graph in response to a change in the graph-structured data associated with the first graph. The change in the graph-structured data can include an addition of a relationship between a first viewed node of the number of viewed nodes and a remainder of the number of viewed nodes and/or the first viewed node and the number of underlying nodes. In an example, the change in graph-structured data can include a subtraction of a relationship between the first viewed node of the number of viewed nodes and a remainder of the number of viewed nodes and/or the first viewed node and the number of underlying nodes. Alternatively, and/or in addition, the change in graph-structured data can include an addition and/or subtraction of a viewed node and/or an underlying node.

Construction of the second graph can include determining 206 a number of viewed edges between a first viewed node of the number of viewed nodes and a remainder of the number of viewed nodes. Construction of the second graph can include determining 208 a number of node connects for the first viewed node.

Construction of the second graph can include providing 210 an indication of completeness of the first viewed node based on whether the number of node connects is greater than the number of viewed edges between the first viewed node and the number of viewed nodes. The indication of completeness can include an indication that the first viewed node is incomplete when the number of node connects for the first viewed node is greater than the number of viewed edges between the first viewed node and the number of viewed nodes. Alternatively, and/or in addition, the indication of completeness can include an indication that the first viewed node is complete when the number of node connects for the first viewed node is equal to the number of viewed edges between the first viewed node and the number of viewed nodes.

In various embodiments, providing the indication that the first viewed node is incomplete can include providing an indication that is user selectable. In an example, an indication can be an icon (e.g., positive symbol, dot, geometric shape, number) that is displayed proximate to and/or on one of the number of viewed nodes that has been indicated as incomplete.

In some examples, the indication may be provided by filling one of the number of viewed nodes that has been indicated as incomplete with a color distinct from that of viewed nodes that have been indicated as complete. Alternatively, and/or in addition, the indication can be provided via a dropdown menu that can list each of the number of viewed nodes and provide an indication proximate to each of the number of viewed nodes in the list, indicating whether the node is incomplete. In an example, the user can select the indication (e.g., via a cursor) that one of the number of viewed nodes is incomplete, as discussed herein.

The method can include merging 212 the first graph and the second graph to create a merged graph. Merging of the first and second graph can be accomplished through use of the visualization client. The merged graph can include a graph that is visualized and displays the change in the graph-structured data associated with the first graph. Merging the first graph and the second graph to create the merged graph can include removing viewed nodes and their respective viewed edges that no longer exist.

In an example, removing the viewed nodes and their respective viewed edges that no longer exist can be performed by causing the visualization client to query the graph data tool for changes to the graph-structured data. The visualization client can then receive the changes to the graph-structured data from the graph data tool and proceed with merging the first and second graph to reflect the changes. Alternatively, and/or in addition, the graph data tool can push graph metadata that includes the changes to the graph-structured data to the visualization client.

Merging the first graph and the second graph to create the merged graph can include removing a number of viewed edges that no longer exist. In an example, if the change to the graph-structured data indicates that a relationship between two viewed nodes no longer exists, the viewed edge between the two viewed nodes can be removed. As discussed herein, the viewed edge that no longer exists can be removed by the visualization client upon receiving graph metadata from the graph data tool that includes the changes to the graph.

Merging the first graph and the second graph to create the merged graph can include adding a number of new viewed edges between the number of viewed nodes. In an example, if the change to the graph-structured data indicates that a new relationship between two viewed nodes is created, the new viewed edge can be added. As discussed herein, the new viewed edge can be added by the visualization client upon receiving metadata from the graph data tool that includes the changes to the graph.

When the first graph has been merged with the second graph to create the merged graph, an instruction can be executed that causes the merged graph to be communicated. In an example, the graph can be communicated to a display, a file, and/or storage medium, for example. The merged graph can display the same set of viewed nodes and/or viewed edges that were displayed in the first graph, less any viewed nodes and/or edges that no longer exist. In addition, the merged graph can display the indication of completeness for the number of viewed nodes.

The changes that can take place in a network (e.g., social network) can be extensive and by providing a user with the same set of viewed nodes that were in the first graph, less any viewed nodes and/or viewed edges that no longer exist, it can be easier for a user to see how the viewed nodes and/or viewed edges of the first graph changed. If there are underlying nodes and/or edges associated with a particular viewed node and the user wishes to view the underlying nodes and/or underlying edges and/or changes to the underlying nodes and/or underlying edges, the user can select the indication that the particular viewed node is incomplete. Upon selection of the indication that the particular viewed node is incomplete, the selection can cause the underlying nodes and/or underlying edges associated with the particular viewed node to be communicated.

Figure 3:
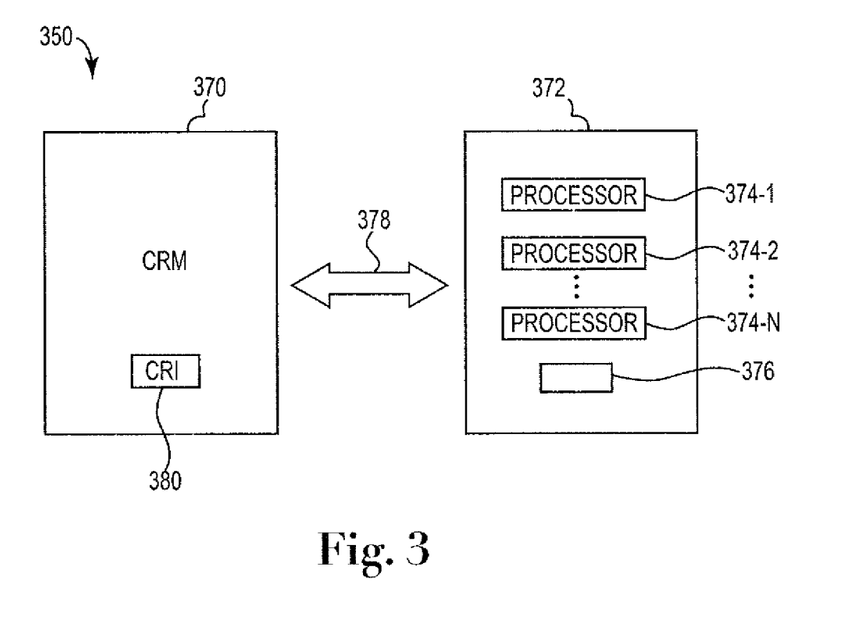
FIG. 3 illustrates a block diagram of an example of a computer-readable medium in communication with processor resources according to the present disclosure.

FIG. 3 illustrates a block diagram 350 of an example of a computer-readable medium in communication with processing resources for reflecting changes to graph-structured data according to the present disclosure. The computer-readable (CRM) 370 medium can include computer-readable instructions 380 to cause a computer to receive a plot of a number of viewed nodes on a first graph with a graph data tool, wherein the number of viewed nodes and the first graph are received in a first format. The format of the number of viewed nodes and/or the first graph can include a position of the first viewed node and/or the number of viewed nodes on the first graph; a color of the first viewed node, and/or of the first graph; a size of the first viewed node and/or the number of viewed nodes; and/or a layout of the graph, which can include a view of the graph (e.g., whether or not the graph has been zoomed in and/or out).

The CRM 370 can include instructions 380 to cause the computer to format the number of viewed nodes and/or the graph in a format and maintain the format of the number of nodes and/or the graph in the merged graph. The CRM 370 can include instructions 380 to cause the computer to construct a second graph in response to a change in the graph-structured data associated with the first graph that indicates a first viewed node is incomplete when a number of node connects for the first viewed node is greater than a number of viewed edges between the first viewed node and the number of viewed nodes.

The CRM 370 can include instructions 380 to cause the computer to merge the first graph and the second graph to create a merged graph. In creating the merged graph, a number of viewed nodes that no longer exist can be removed along with their respective edges; a number of viewed nodes that no longer exists between the first viewed node and the number of viewed nodes can be removed; and a number of viewed edges that are created between the first viewed node and the number of viewed nodes can be added. The CRM 370 can include instructions 380 to cause the merged graph to be communicated in the first format by the computer, wherein the merged graph includes the number of viewed nodes that still exist.

CRM 370 can be in communication with a computing device 372 having processor resources of more or fewer than 374-1, 374-2, . . . , 374-N, that can be in communication with, and/or receive a tangible non-transitory CRM 370 storing a set of computer-readable instructions 380 executable by one or more of the processor resources (e.g., 374-1, 374-2, . . . , 374-N) for reflecting changes to graph-structured data as described herein. The stored instructions may be an installed program or an installation pack. If an installation pack, the memory, for example, can be a memory managed by a server such that the installation pack can be downloaded. The computing device may include memory resources 376, and the processor resources 374-1, 374-2, . . . , 374-N may be coupled to the memory resources 376.

Processor resources 374-1, 374-2, . . . ,374-N can execute computer-readable instructions 380 for reflecting changes to graph-structured data that are stored on an internal or external non-transitory CRM 370. A non-transitory CRM (e.g., CRM 370), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, Digital Video Discs® (DVD), Blu-ray Discs® (BD), Compact Discs® (CD), and/or a solid state drive (SSD), flash memory, etc., as well as other types of CRM.

The non-transitory CRM 370 can be integral, or communicatively coupled, to a computing device, in either in a wired or wireless manner. For example, the non-transitory CRM can be an internal memory, a portable memory, a portable disk, or a memory located internal to another computing resource (e.g., enabling computer-readable instructions 380 to be downloaded over the Internet).

The CRM 370 can be in communication with the processor resources (e.g., 374-1, 374-2, . . . , 374-N) via a communication path 378. The communication path 378 can be local or remote to a machine associated with the processor resources 374-1, 374-2, . . . , 374-N. Examples of a local communication path 378 can include an electronic bus internal to a machine such as a computer where the CRM 370 is one of volatile, non-volatile, fixed, and/or removable storage medium in communication with the processor resources (e.g., 374-1, 374-2, . . . , 374-N) via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 378 can be such that the CRM 370 is remote from the processor resources (e.g., 374-1, 374-2, . . . , 374-N) such as in the example of a network connection between the CRM 370 and the processor resources (e.g., 374-1, 374-2, . . . , 374-N). That is, the communication path 378 can be a network connection. Examples of such a network connection can include a local area network (LAN), a wide area network (WAN), a personal area network (PAN), and the Internet, among others. In such examples, the CRM 370 may be associated with a first computing device and the processor resources (e.g., 374-1, 374-2, . . . , 374-N) may be associated with a second computing device.

Processor resources 374-1, 374-2, . . . , 374-N coupled to the memory 376 can receive a plot of a number of viewed nodes that are viewed on a first graph from a visualization client with a graph data tool in response to a change in the graph-structured data associated with the first graph. Processor resources 374-1, 374-2, . . . , 374-N coupled to the memory 376 can also determine a number of viewed edges between a first viewed node of the number of viewed nodes and the number of viewed nodes and determine a number of node connects for the first viewed node.

The processor resources 374-1, 374-2, . . . , 374-N coupled to the memory 376 can also construct a second graph that indicates the first viewed node is incomplete when the number of node connects is greater than the number of viewed edges between the first viewed node and the number of viewed nodes. Processor resources 374-1, 374-2, . . . , 374-N coupled to the memory 376 can merge the first graph and the second graph with the visualization client to create a merged graph. Furthermore, processor resources 374-1, 374-2, . . . , 374-N coupled to the memory 376 can cause the merged graph to be communicated.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A method comprising:
    receiving, by a graphing tool, a plot of a first set of viewed nodes that are viewed on a first graph;
    detecting a change to source data associated with the first graph, the change to the source data comprising a relationship change for a first entity, wherein the first entity is represented in the first graph by a first viewed node of the first set of viewed nodes, wherein the source data is external to the graphing tool;
    in response to detecting the change to the source data:
        constructing, without user interaction, a second graph based on the source data, wherein the second graph comprises a first additional node that is not included in the first graph;
        formatting, without user interaction, the second graph to match a format of the first graph, wherein formatting the second graph comprises:
            displaying the first set of viewed nodes that are viewed on the first graph, wherein the first set of viewed nodes are displayed in the same positions shown in the first graph; and
            displaying an indication of completeness on the formatted second graph to indicate that the first additional node is not displayed in the formatted second graph.

2. The method of claim 1, wherein the relationship change for the first entity comprises an addition of a relationship between the first entity and a second entity.

3. The method of claim 2, wherein the second entity is represented by the first additional node.

4. The method of claim 2, wherein the relationship between the first entity and the second entity is defined in a social media application.

5. The method of claim 1, wherein the method includes providing an indication that the first viewed node is incomplete when the number of node connects for the first viewed node is greater than the number of viewed edges between the first viewed node and the number of viewed nodes.

6. The method of claim 5, wherein providing the indication that the first viewed node is incomplete includes providing an indication that is user selectable.

7. The method of claim 6, wherein the method includes causing a number of underlying nodes related to the first viewed node to be communicated upon receiving a selection of the indication by the user.

8. The method of claim 1, wherein providing an indication of completeness of the first viewed node includes providing an indication that the first viewed node is complete when the number of node connects for the first viewed node is equal to the number of viewed edges between the first viewed node and the number of viewed nodes.

9. A computer-readable non-transitory medium storing instructions executable by a computer to cause the computer to:
    receive, by a graphing tool, a plot of a first set of viewed nodes that are viewed on a first graph, wherein the first set of viewed nodes and the first graph are received in a first format;
    detect a change to source data associated with the first graph, the change to the source data comprising a relationship change for a first entity, wherein the first entity is represented in the first graph by a first viewed node of the first set of viewed nodes, wherein the source data is external to the graphing tool;

in response to the change to the source data:
construct, without user interaction, a second graph based on the source data, wherein the second graph comprises a first additional node that is not included in the first graph;
format, without user interaction, the second graph to match the first format of the first graph, wherein the formatted second graph comprises:
a display of the first set of viewed nodes that are viewed on the first graph, wherein the first set of viewed nodes are displayed in the same positions shown in the first graph; and
a display of an indication of completeness to indicate that the first additional node is not displayed in the formatted second graph.

10. The computer-readable non-transitory medium of claim 9, wherein the relationship change for the first entity comprises an additional of a relationship between the first entity and a second entity, wherein the second entity is represented by the first additional node.

11. The computer-readable non-transitory medium of claim 9, wherein the instructions include instructions executable by the computer to format the first viewed node in a color on the first graph and maintain the color of the first viewed node on the formatted second graph.

12. The computer-readable non-transitory medium of claim 9, wherein the instructions include instructions executable by the computer to format the first viewed node in a size on the first graph and maintain the size of the first viewed node on the formatted second graph.

13. The computer-readable non-transitory medium of claim 9, wherein the instructions include instructions executable by the computer to format the first graph in a layout and maintain the layout of the first graph in the formatted second graph.

14. A system comprising:
a memory;
a processor coupled to the memory, to:
receive, by a graphing tool, a plot of a number of viewed nodes that are viewed on a first graph in a first format;
detect a change to source data associated with the first graph, the change to the source data comprising a relationship change for a first entity, wherein the first entity is represented in the first graph by a first viewed node of the first set of viewed nodes, wherein the source data is external to the graphing tool;
in response to the change in the source data associated with the first graph:
construct, without user interaction, a second graph based on the source data, wherein the second graph comprises a first additional node that is not included in the first graph;
format, without user interaction, the second graph to match the first format of the first graph, wherein the formatted second graph comprises:
a display of the first set of viewed nodes that are viewed on the first graph, wherein the first set of viewed nodes are displayed in the same positions shown in the first graph; and
a display of an indication of completeness to indicate that the first additional node is not displayed in the formatted second graph.

15. The system of claim 14, wherein the first graph and the second graph, are directed acyclic graphs.

16. The system of claim 14, including the processor to query the graphing tool using the visualization client for changes in the source data associated with the first graph.

17. The system of claim 14, the graphing tool to push graph metadata indicating a change to the source data to the visualization client.

18. The system of claim 14, wherein the visualization client includes multiple components that cause the source data to be communicated to a display.

19. The system of claim 14, wherein the relationship change for the first entity comprises an additional of a relationship between the first entity and a second entity, wherein the second entity is represented by the first additional node.

20. The system of claim 14, wherein the relationship between the first entity and the second entity is defined in a social media application.

* * * * *